United States Patent [19]

Sugiyama et al.

[11] Patent Number: 4,660,099
[45] Date of Patent: Apr. 21, 1987

[54] ROTARY RECORDING MEDIUM HAVING TRACK TURNS RECORDED WITH DIGITAL SIGNAL AND TRACK TURNS RECORDED WITH ANALOG SIGNAL

[75] Inventors: Hiroyuki Sugiyama, Isehara; Nobuaki Takahashi, Yamato; Takeshi Shibamoto, Sagamihara; Kazunori Nishikawa, Machida; Shoji Ueno, Zama; Makoto Komura, Tokyo; Shunichi Shichijo, Sagamihara, all of Japan

[73] Assignee: Victor Company of Japan, Ltd., Yokohama, Japan

[21] Appl. No.: 609,193

[22] Filed: May 11, 1984

[30] Foreign Application Priority Data

May 12, 1983 [JP] Japan ................................ 58-83232
May 12, 1983 [JP] Japan ................................ 58-83234

[51] Int. Cl.[4] .......................................... H04N 5/76
[52] U.S. Cl. ..................................... 358/342; 360/48; 369/59
[58] Field of Search ........................ 358/342, 341, 343; 360/19.1, 39, 48, 53; 369/59

[56] References Cited

U.S. PATENT DOCUMENTS 4,476,499 10/1984 Kanamaru et al. ................ 358/342
4,513,327 4/1985 Takahashi et al. ................ 358/310

Primary Examiner—Robert L. Richardson
Attorney, Agent, or Firm—Michael N. Meller

[57] ABSTRACT

A rotary recording medium has information signals recorded on a spiral or concentric tracks formed thereon as variations in geometrical configuration. The tracks comprise a mixture of digital recorded tracks which are recorded with a first modulated signal and analog recorded tracks which are recorded with a second modulated signal. The first modulated signal is a digital signal which has been time-sequentially multiplexed in terms of blocks at a transmission frequency of 44.1 kHz or a frequency extremely close to 44.1 kHz and has then been subjected to a modulation, where each of the blocks are constituted by a synchronizing signal, error correcting codes, and an error detecting code, which are added to a plurality of channels of digital data which are digitally modulated information signals. The second modulated signal is an analog modulated analog information signal at least including a composite video signal. A number of blocks recorded in one track turn of the digital recorded tracks is approximately equal to a product of the transmission frequency and a duration of one revolution of the rotary recording medium.

8 Claims, 12 Drawing Figures

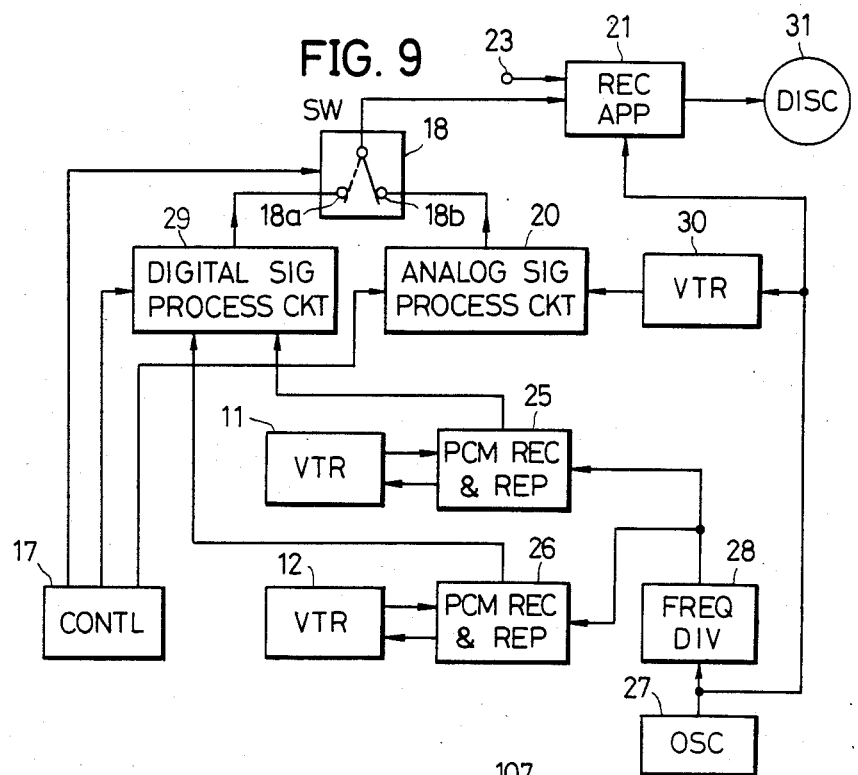
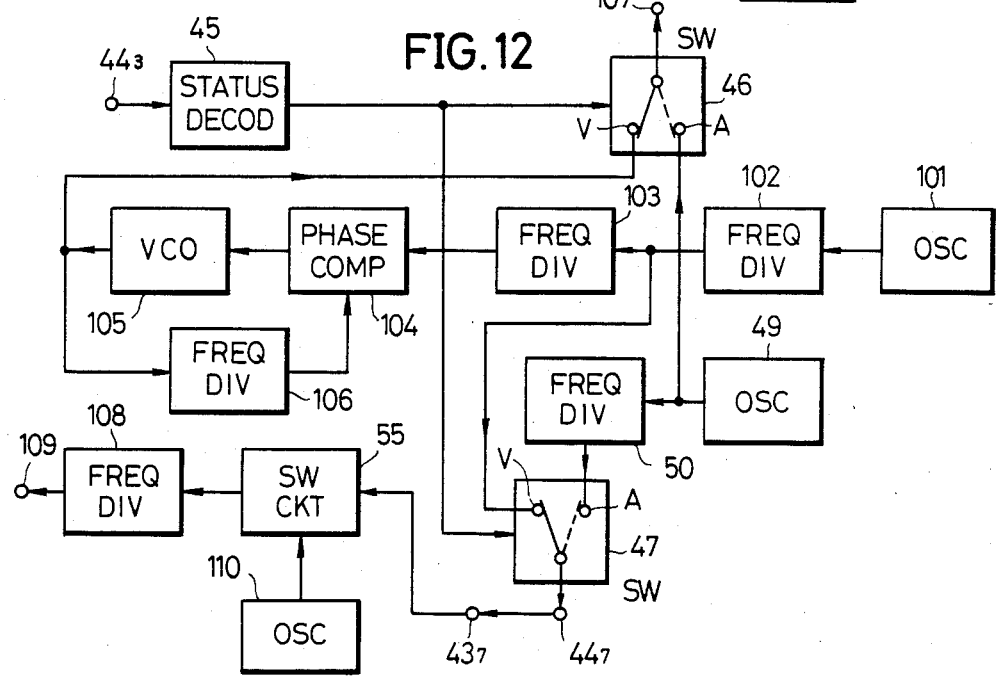

ROTARY RECORDING MEDIUM HAVING TRACK TURNS RECORDED WITH DIGITAL SIGNAL AND TRACK TURNS RECORDED WITH ANALOG SIGNAL

BACKGROUND OF THE INVENTION

The present invention generally relates to rotary recording mediums, and more particularly to a rotary recording medium recorded with information signals on a continuous spiral track which is formed on the same side of the rotary recording medium, in which tracks which are recorded with digital signals mainly including audio information and tracks which are recorded with analog signals mainly including a composite video signal coexist on the rotary recording medium.

There is a known type of a rotary recording medium (hereinafter simply referred to as a disc) which is recorded with analog information signals such as a composite video signal and audio signals. In such a disc, the analog information signals are subjected to a frequency modulation, for example, and are recorded on a spiral track or concentric tracks on the disc as variations in geometrical configuration, for example. This disc is often referred to as a video disc because the recorded information mainly includes the composite video signal. The composite video signal or the like is recorded on the tracks on the video disc in the form of modulated signals which are obtained by modulating a carrier by the analog information signals. An address signal which is used for random access and the like, is recorded within a predetermined duration within a vertical blanking period of the composite video signal, for example. The address signal itself is an encoded digital signal, however, the main information recorded on the video disc is the analog modulated composite video signal or the like. Hence, in the present specification, tracks such as the recorded tracks of this video disc, will be referred to as "analog recorded tracks" for convenience' sake.

On the other hand, there is another type of a disc which is recorded with digital signals. In such a disc, audio signals or audio and video signals are subjected to a digital modulation, and are time-sequentially multiplexed and recorded on concentric tracks or a spiral track on the disc as variations in geometrical configuration, for example. This disc is often referred to as a digital audio disc because the recorded information mainly includes the audio signals, and the video signal mainly relates to a still picture and is simply recorded as a supplementary information to help the listener with his imagination. The audio signals or the audio and video signals are recorded on the tracks on the digital audio disc after being converted into the form of digital signals which are obtained by subjecting the audio signals or the audio and video signals to a digital modulation and then subjecting the digital modulated signals to a frequency modulation or the like. In the present specification, tracks such as the recorded tracks of this digital audio disc, will be referred to as "digital recorded tracks" for convenience' sake.

In an electrostatic capacitance type video disc proposed in a U.S. Pat. No. 4,331,976, the recorded signals are reproduced from the video disc by detecting the variations in the electrostatic capacitance which is formed between the video disc and an electrode of a reproducing stylus. Reference signals for tracking control, are recorded on both sides of the information signal recorded track (analog recorded track). According to this video disc, the need for a stylus guide groove was eliminated by use of the reference signals, is known. In this known video disc, a tracking control was carried out with respect to the reproducing stylus so that the reproducing stylus accurately scans over the information recorded track during the reproduction mode, by comparing the levels of the reference signals which are reproduced from the video disc.

On the other hand, an electrostatic capacitance type digital audio disc is also known. The electrostatic capacitance type digital audio disc has no stylus guide groove and is recorded with reference signals for tracking control on both sides of the information signal recorded track (digital recorded track), similarly as in the case of the electrostatic capacitance type video disc. During the reproducing mode, this electrostatic capacitance type digital audio disc is rotated at a predetermined rotational speed which is the same as the rotational speed of the electrostatic capacitance type video disc. The frequencies of the reference signals and the method of reproducing the reference signals, are the same between the electrostatic capacitance type digital audio disc and the electrostatic capacitance type video disc. Further, in both the electrostatic capacitance type digital audio disc and the electrostatic capacitance type video disc, the recorded signals are reproduced from the disc by detecting the variations in the electrostatic capacitance between the disc and the electrode of the reproducing stylus. For these reasons, even when the digital audio disc is played on a video disc reproducing apparatus which is designed to play the video disc, the tracking control is carried out with respect to the reproducing stylus similarly as in the case where the video disc is played, and the recorded signals can be picked up and reproduced from the digital audio disc by the reproducing stylus. The signals which are reproduced from the digital audio disc, are demodulated into original audio signals or the like in an adapter which is coupled to the video disc reproducing apparatus.

Accordingly, the previously proposed electrostatic capacitance type video disc and the electrostatic capacitance type digital audio disc can be played on the same electrostatic capacitance type video disc reproducing apparatus. In other words, the above video disc and the digital audio disc can be played compatibly on the same video disc reproducing apparatus.

However, the digital audio disc and the video disc were mutually independent discs, and the compatibility did not exist in the true sense of the word. On the other hand, the digital audio disc is recorded with digital signals. Thus, compared to the video disc, the audio signals are reproduced from the digital audio disc with a wide dynamic range and with an extremely high fidelity, due to the characteristics of the digital signal transmission. Moreover, the still picture which is reproduced from the digital audio disc is extremely sharp, and there is of course an advantage in that the audio signals are reproduced from the digital audio disc with an extremely high fidelity together with the still picture. On the other hand, the still picture is reproduced from the video disc by repeatedly reproducing the same track on the video disc. Generally, the audio signals are muted during the still picture reproduction, and it is impossible to simultaneously reproduce the audio signals and the video signal from the video disc. However, due to the analog signal transmission in the video disc, it is possible to transmit the information signals in real time with a frequency band in the range of several MHz according to the video disc. Thus, compared to the digital audio disc in which the information signals are transmitted with a frequency band in the range of several tens of kHz in order to improve the transmitting accuracy, the video disc is advantageous in that it is possible to simultaneously reproduce a moving picture and the audio signals. Accordingly, in order to ensure optimum reproduction of the recorded signals it is desirable to select and record one of the digital signal and the analog signals depending on the information contents.

SUMMARY OF THE INVENTION

Accordingly, it is a general object of the present invention to provide a novel and useful disc in which the problems described heretofore have been eliminated.

Another and more specific object of the present invention is to provide a disc on which analog recorded tracks and digital recorded tracks coexist on the same side thereof. Modulated signals which are obtained by subjecting information signals including a composite video signal to an analog modulation, are recorded on the analog recorded tracks at a rate of N fields for one revolution of the disc, where N is a natural number greater than or equal to 2. Digital signals are subjected to a modulation, and are recorded on the digital recorded tracks. The digital signals are obtained by time-sequentially multiplexing digital data and the like in terms of blocks, where the digital data are obtained by subjecting information signals to a digital modulation. The digital data and the like are time-sequentially multiplexed with a transmission frequency such that the digital signals can be reproduced at a rotational speed which is the same as the rotational speed used when reproducing the analog recorded tracks. According to the disc of the present invention, the analog recorded tracks and the digital recorded tracks can be reproduced from the disc by only slightly modifying an existing disc reproducing apparatus, and a true compatibility is achieved.

Still another object of the present invention is to provide a disc having analog recorded tracks which are mainly recorded with a video signal related to a moving picture and audio signals, and digital recorded tracks which are mainly recorded with a video signal related to a still picture and audio signals of a plurality of channels related to music or the like with strict requirements especially with respect to the sound quality and fidelity. According to the disc of the present invention, it is possible to satisfactorily reproduce the moving picture and audio information. Further, it is possible to obtain a reproduced still picture which is extremely sharp compared to the still picture which is reproduced from the video disc. Moreover, it is possible to reproduce the audio information from the digital recorded tracks, with a wide dynamic range and with a high fidelity compared to the conventional video disc. As a result, programs can be recorded on the disc by the manufacturer so that the video information and the audio information can be reproduced in optimum states depending on the information contents, and the superior effect of the disc according to the present invention is far greater than the anticipated effect of simply combining the audio disc and the video disc.

A further object of the present invention is to provide a disc in which the number of blocks recorded on one digital recorded track, is equal to the product of a duration of one revolution of the disc and a transmission frequency of the blocks. According to the disc of the present invention, a master clock frequency which is used to demodulate the digital signals in the reproducing apparatus, can be set to a constant frequency. For this reason, the circuitry in the reproducing apparatus can be simplified. In addition, it is possible to carry out the digital demodulation in the reproducing apparatus so as to obtain high-quality demodulated signals which have no jitter.

Another object of the present invention is to provide a disc in which a first track recorded with a first FM signal and a second track recorded with a second FM signal, are respectively recorded between the analog recorded track and the digital recorded track. The first FM signal is obtained by subjecting a signal which is silent and includes no data, to a modulation. The second FM signal is obtained by subjecting a predetermined composite video signal to a frequency modulation. According to the disc of the present invention, it is possible to positively detect a position where the recorded track changes from one of the analog recorded track and the digital recorded track to the other, even when a dropout or the like occurs in the reproduced signal as the track which is being reproduced changes from the one recorded track to the other. Further, even when there is a time delay in a circuit which carries out a switching and operates one of a digital signal demodulating circuit and an analog signal demodulating circuit so as to demodulate the signals which are reproduced from the disc, it is possible to demodulate the signals reproduced from the analog recorded tracks or the digital recorded tracks only after one of the demodulating circuits has been operated.

Other objects and further features of the present invention will be apparent from the following detailed description when read in conjunction with the accompanying drawings.

BRIEF DESCRIPTION OF THE DRAWINGS

FIG. 9 is a systematic block diagram showing a second embodiment of a recording system for recording the disc according to the present invention;

FIG. 12 shows an essential part of another example of a reproducing apparatus which plays the disc according to the present invention.

DETAILED DESCRIPTION

Figure 1:
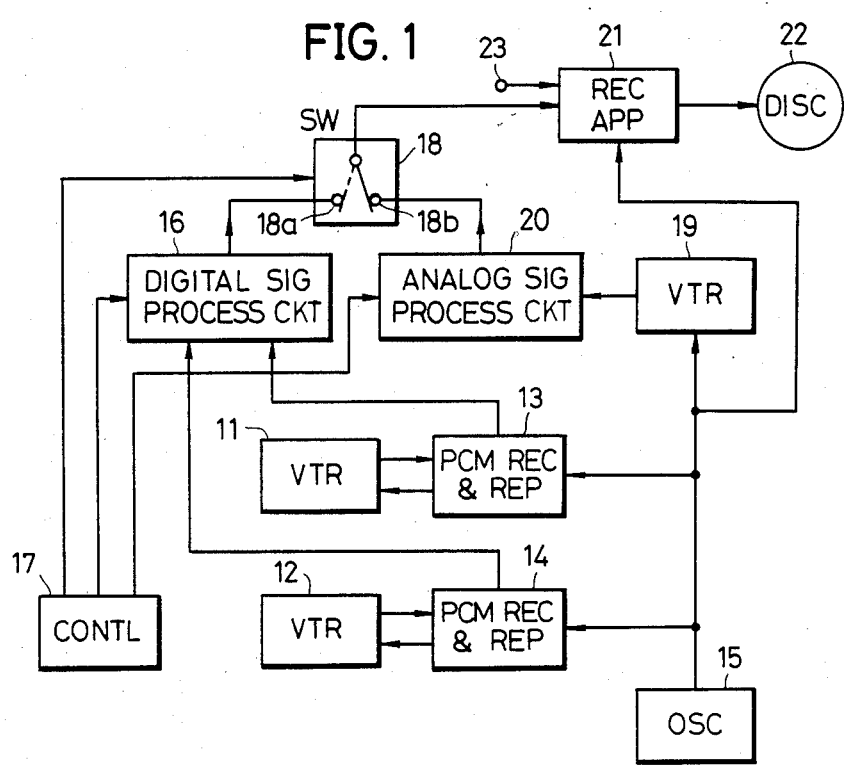
FIG. 1 is a systematic block diagram showing a first embodiment of a recording system for recording a disc according to the present invention.

In FIG. 1, 2-channel video tape recorders (VTRs) 11 and 12 are each supplied with a synchronizing signal from respective PCM recording and reproducing apparatuses 13 and 14. On the other hand, the VTRs 11 and 12 each reproduce a 2-channel information signal which has been pre-recorded on a magnetic tape, and the reproduced information signals from the VTRs 11 and 12 are supplied to the respective PCM recording and reproducing apparatuses 13 and 14 to be recorded. The reproduced information signals from the VTRs 11 and 12, may be 2-channel audio signals, one channel of a monaural audio signal and another channel of a monaural audio signal or a still picture signal, or two channels of still picture signals. For example, the still picture signals have a signal format in which component coded data obtained by subjecting signals related to still pictures which are only in video durations of a composite color video signal employing 625 scanning lines to a digital modulation, are successively inserted into video durations of a composite synchronizing signal which is in conformance with the NTSC system.

The PCM recording and reproducing apparatuses 13 and 14 each subject an input signal to a pulse code modulation (PCM), and generate an error detecting code and error correcting codes so as to form a PCM signal including the pulse code modulated signal and these codes. The PCM recording and reproducing apparatuses 13 and 14 each add to this PCM signal horizontal and vertical synchronizing signals which are in conformance with the NTSC system, and record the signal which is obtained to a magnetic tape and reproduce the signal from the magnetic tape. For example, the PCM recording and reproducing apparatuses 13 and 14 each record 6 information words (3 words in each of the right and left channels) in one horizontal scanning period (1H). Since the data is not transmitted in a duration of 35H in one frame, a sampling frequency $f_s$ can be described by an equation $f_s = 3 \times f_H \times (525-35)/525$, where $f_H$ is a horizontal scanning frequency. The PCM recording and reproducing apparatuses are operated in synchronism with a signal from an oscillator 15 having a frequency of 15.734 kHz which is equal to the horizontal scanning frequency of the NTSC system. Thus, when the frequency of 15.734 kHz is substituted into the above equation, the sampling frequency $f_s$ becomes equal to 44.056 kHz.

A total of four channels of digital signals having the sampling frequency of 44.056 kHz and a quantization number of 16 bits, are respectively supplied to a digital signal processing circuit 16 from the PCM recording and reproducing apparatuses 13 and 14. The digital signal processing circuit 16 generates a signal of one block (frame) having a signal format shown in FIG. 2, under control of an output signal of a controller 17. The digital signal processing circuit 16 time-sequentially multiplexes the generated signal in terms of blocks, at a transmission frequency of 44.056 kHz. Further, the digital signal processing circuit 16 obtains a frequency modulated signal by frequency-modulating a carrier having a frequency in the range of 7 MHz, for example, by the time-sequentially multiplexed signal, and applies this frequency modulated signal to a terminal 18a of a switching circuit 18.

Figure 2:
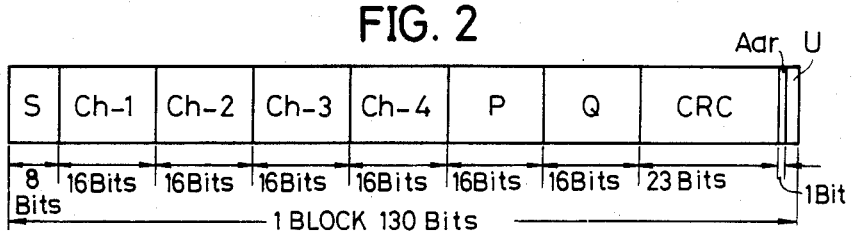
FIG. 2 shows an example of a signal format of one block of digital signal which is recorded on digital recorded tracks on the disc according to the present invention.

In the signal of one block shown in FIG. 2, S indicates the position of a synchronizing signal which has an 8-bit fixed pattern and identifies the beginning of a block Ch-1, Ch-2, Ch-3, and Ch-4 respectively indicate the position of one word of a digital signal having 16 bits. This digital signal may be a digital audio signal which is obtained by subjecting an audio signal to a pulse code modulation, or a digital video signal which is obtained by subjecting a video signal to a pulse code modulation. For example, the signals described under one of the following cases (a) through (d) may be arranged in the positions Ch-1 through Ch-4.

(a) A case where one word of each of four channels of digital audio signals, is arranged in the positions Ch-1 through Ch-4.

(b) A case where one word of each of three channels of digital audio signals is arranged in the positions Ch-1 through Ch-3, and two picture element data of a digital video signal having a quantization number of 8 bits, for example, are arranged in the position Ch-4.

(c) A case where data of each of the channels in a first 2-channel stereo digital audio signal are arranged in the positions Ch-1 and Ch-2, and data of each of the channels in a second 2-channel stereo digital audio signal are arranged in the positions Ch-3 and Ch-4.

(d) A case where data of each of the channels in a 2-channel digital audio signal are arranged in the positions Ch-1 and Ch-2, and picture element data of the same kind or different kinds of digital video signal having a quantization number of 8 bits are arranged in the positions Ch-3 and Ch-4.

In addition, P and Q in FIG. 2 indicate positions of 16-bit error correcting codes. The error correcting codes P and Q are generated based on the following equations (1) and (2), for example, where $W_1$, $W_2$, $W_3$, and $W_4$ represent the 16-bit digital signals (normally, digital signals in different blocks) arranged in the positions Ch-1 through Ch-4, T represents a companion matrix of a predetermined polynomial, and a symbol "$\oplus$" represents a modulo-2 addition between each of the corresponding bits.

$$P = W_1 \oplus W_2 \oplus W_3 \oplus W_4 \quad (1)$$

$$Q = T^4 \cdot W_1 \oplus T^3 \cdot W_2 \oplus T^2 \cdot W_3 \oplus T \cdot W_4 \quad (2)$$

Further, in FIG. 2, CRC indicates a position of a 23-bit error detecting code. The error detecting code is a 23-bit remainder which is obtained when each of the words arranged in the positions Ch-1 through Ch-4, P, and Q of the same block are divided by a generating polynomial of $X^{23} + X^5 + X^4 + X + 1$, for example. When the signals in the 9-th through 127-th bits of the same block are divided by the above generating polynomial during the reproduction and the remainder is zero, it is detected that there is no error in that block. Moreover, in FIG. 2, Adr indicates a multiplexing position of 1 bit of one of various kinds of address signals which are used during a random access and the like. The bits of the address signal are distributed, and 1 bit of the address signal is transmitted in one block. For example, all of the bits of the address signal are transmitted in 196 blocks (in this case, the address signal has 196 bits).

In FIG. 2, U indicates a position of a 2-bit signal which is often called user's bits. One block of the digital signal is therefore made up of 130 bits from the position S to the position U. The digital signal is time-sequentially multiplexed and transmitted in terms of blocks, at a frequency of 44.056 kHz which is equal to the sampling frequency of the digital audio signal.

Figure 3:
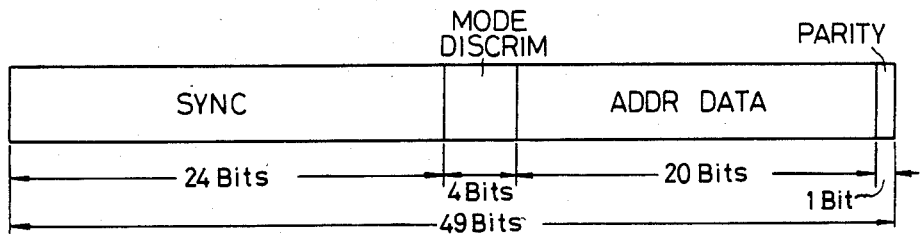
FIG. 3 shows an example of a signal format of each of address codes which are recorded on the digital recorded tracks on the disc according to the present invention.

For example, the 196-bit address signal is time-sequentially made up from four kinds of address codes each having 49 bits. The four kinds of address codes comprise a time address code and first through third chapter address codes, for example, and the constitution of each address code is the same. The address codes each have a signal format shown in FIG. 3. In FIG. 3, a 24-bit synchronizing signal is arranged in the first 24 bits of the address code as indicated by SYNC. The value of the 24-bit synchronizing signal differs depending on the four kinds of address codes. 4 bits which are subsequent to the 24-bit synchronizing signal, includes a source mode signal, a normal/stop mode discriminating signal, and the like. The source mode signal indicates the source mode, that is, the combination of the recorded signals from among the cases (a) through (d) described before. The normal/stop mode discriminating signal indicates whether the video disc player should assume a stop reproduction mode in which the same track turn is repeatedly reproduced. The address data is located in the 20 bits which are subsequent to these 4 bits, and the last 1 bit of the address code is a parity bit.

In the case of the time address code, the address data is a time data which indicates the reproducing time which would take in the normal reproduction mode to reach the track position where that time address code is recorded, from the starting position where the recording of the programs was started at the time of the recording. On the other hand, in the case of the chapter address code, the address data indicates the location of the music program which is recorded at the position where that chapter address code is recorded, with respect to the starting position where the recording of the programs was started at the time of the recording. Thus, the chapter address code indicates that the music program is the third program from the starting position on a disc, for example.

As will be described later on in the specification, an NTSC system color video signal is recorded on a disc 22 at a rate of four fields in one revolution of the disc 22. This means that the recorded signals are reproduced in a state where the disc 22 is rotated at a rotational speed of 889.1 ($=(59.94/4) \times 60$) revolutions per minute. Hence, 2940 ($=44.056 \times 10^3 \times (4/59.94)$) blocks (frames) are recorded on and reproduced from the disc 22 in one revolution of the disc 22. Accordingly, the 196-bit address signal is recorded on and reproduced from the disc 22, 15 times in one revolution of the disc 22.

When transmitting the digital video signal related to the still picture by arranging the digital video signal in the position Ch-3 and/or the position Ch-4 shown in FIG. 2, the picture element data of the luminance signal, having a sampling frequency of 9 MHz and a quantization number of 8 bits, are converted into luminance picture element data having a sampling frequency of 88.112 kHz. Moreover, the picture element data of the two kinds of color difference signals (R-Y) and (B-Y), having a sampling frequency of 2.25 MHz and a quantization number of 8 bits, are converted into color difference picture element data having a sampling frequency of 88.112 kHz. These luminance picture element data and color difference picture element data corresponding to one frame, are transmitted with a signal format shown in FIG. 4.

Figure 4:
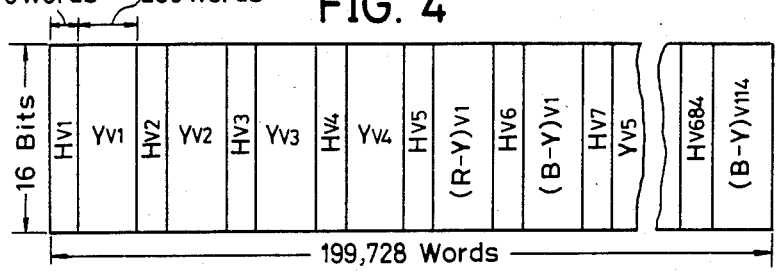
FIG. 4 shows an example of a signal format of a digital video signal which is recorded on the digital recorded tracks on the disc according to the present invention.

In FIG. 4, one word is made up of 16 bits, and each of the picture element data having the quantization number of 8 bits are arranged in the upper 8 bits and the lower 8 bits of one word. Hence, two picture element data can be transmitted in one word. The digital video signal corresponding to one frame comprises a total of 199,728 words as shown in FIG. 4. Picture element data groups $Y_{V1}$ through $Y_{V456}$ of the digital luminance signal each made up of 286 words, picture element data groups $(R-Y)_{V1}$ through $(R-Y)_{V114}$ and $(B-Y)_{V1}$ through $(B-Y)_{V114}$ of the digital color difference signals each made up of 286 words, and a total of 684 header signals $H_{V1}$ through $H_{V684}$ each made up of 6 words and multiplexed to the beginning of each of the picture element data groups, are time-sequentially multiplexed in this digital video signal corresponding to one frame.

Figure 5:
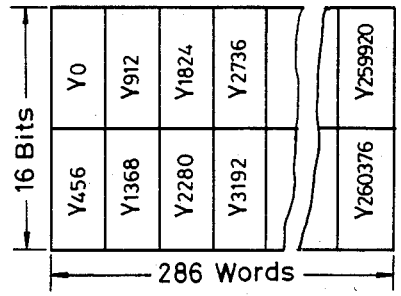
FIG. 5 shows a part of the signal format shown in FIG. 4 in more detail.

A total of 572 luminance picture element data groups in the first vertical column at the leftmost part of the screen are indicated by $Y_{V1}$, and each of the picture element data are arranged in sequence from the top of the screen to the bottom of the screen. As shown in FIG. 5, a picture element data $Y_0$ at the uppermost part of the screen is arranged in the upper 8 bits of the first word, and a picture element data $Y_{456}$ at the second uppermost part of the screen is arranged in the lower 8 bits of the first word. Similarly, a picture element data $Y_{912}$ is arranged in the upper 8 bits of the second word, a picture element data $Y_{1368}$ is arranged in the lower 8 bits of the second word, a picture element data $Y_{1824}$ is arranged in the upper 8 bits of the third word, ..., and a picture element data $Y_{260376}$ at the lowermost part of the screen is arranged in the lower 8 bits of the 286-th word. A total of 572 luminance picture element data groups in the second column from the left end of the screen are indicated by $Y_{V2}$ in FIG. 4, and a total of 572 luminance picture element data groups in the third column from the left end of the screen are indicated by $Y_{V3}$. Similarly, a total of 572 luminance picture element data groups in the i-th (i is an integer from 1 to 456) column from the left end of the screen are indicated by $Y_{Vi}$. Each of the picture element data are arranged similarly as the above picture element data group $Y_{V1}$, and the picture element data corresponding to one vertical column are transmitted by 286 words.

In addition, a total of 572 picture element data groups of the first digital color difference signal arranged in the j-th (j is an integer from 1 to 114) column from the left end of the screen are indicated by $(R-Y)_{Vj}$, and a total of 572 picture element data groups of the second digital color difference signal arranged in the j-th column from the left end of the screen are indicated by $(B-Y)_{Vj}$. Each of the 572 picture element data groups corresponding to one column are arranged in a sequence starting from the top to the bottom of the screen in the upper 8 bits of the first word, lower 8 bits of the first word, upper 8 bits of the second word, lower 8 bits of the second word, upper 8 bits of the third word, ..., and lower 8 bits of the 286-th word, and the picture element data corresponding to one column are transmitted by 286 words. A header signal having 6 bits, for example, is added to the beginning of each of the above divided picture element data groups.

Further, as shown in FIG. 4, the above component coded signal has a signal format in which the signal is time-sequentially transmitted in terms of units, where one unit comprises a total of six picture element data groups, that is, four picture element data groups $Y_{V(4j-3)}$, $Y_{V(4j-2)}$, $Y_{V(4j-1)}$, and $Y_{V(4j)}$ and the two kinds of digital color difference signals $(R-Y)_{Vj}$ and $(B-Y)_{Vj}$.

As shown in FIG. 4, the header signals $H_1$ through $H_{684}$ are respectively arranged at the beginnings of each of the 684 picture element data groups $Y_i$, $(R-Y)_j$, and $(B-Y)_j$. The header signals are transmitted as discriminating signals, so that the reproducing apparatus can discriminate each of the various kinds of information contained in the picture element data group which follows immediately after the header signal. The header signals $H_1$ through $H_{684}$ each comprise 6 words and have a common signal format.

Figure 6:
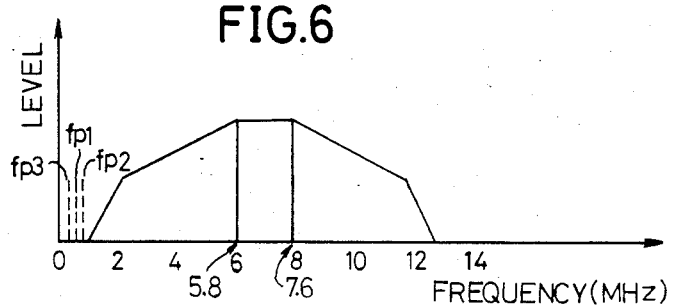
FIG. 6 shows an example of frequency spectrums of frequency modulated signals and reference signals which are recorded on the digital recorded tracks on the disc according to the present invention.

Returning now to the description of FIG. 1, the digital signal processing circuit 16 applies the frequency modulated signal (first FM signal) to the terminal 18a of the switching circuit 18. A frequency spectrum of this first FM signal is indicated by a solid line in FIG. 6. The carrier frequency is equal to 7.6 MHz when the data is "1", and the carrier frequency is equal to 5.8 MHz when the data is "0". In FIG. 6, frequency spectrums represented by phantom lines fp1, fp2, and fp3, indicate the frequency spectrums of reference signals fp1, fp2, and fp3 which are recorded together with the first FM signal.

On the other hand, a VTR 19 plays a magnetic tape which has been pre-recorded with an NTSC system color video signal related to a moving picture and an audio signal, and supplies to an analog signal processing circuit 20 the signals which are reproduced from the magnetic tape. The analog signal processing circuit 20 generates a frequency modulated signal having the same signal format as the frequency modulated signal which is recorded on the video disc described before, and multiplexes each of the various kinds of address signals within the vertical blanking period. The concrete construction of the analog signal processing circuit 20 is disclosed in the U.S. Pat. No. 4,208,671 in which the assignee is the same as the assignee of the present application, for example, and is known. Thus, detailed description will not be given with respect to the concrete construction of the analog signal processing circuit 20.

The analog signal processing circuit 20 produces a band-share-multiplexed signal in which a band limited luminance signal and a low-band-converted carrier chrominance signal which has been frequency-converted into a low frequency range are band-share-multiplexed. The analog signal processing circuit 20 also independently produces a chapter address signal $A_C$, a time address signal $A_T$, and a track number address signal $A_N$. These address signals are multiplexed into specific durations of 1H within the vertical blanking period of the band-share-multiplexed signal, so as to obtain a predetermined multiplexed signal. A predetermined carrier is then frequency-modulated by a signal which is obtained by subjecting the predetermined multiplexed signal to a frequency-division-multiplexing with a frequency modulated audio signal. The address signal $A_C$ indicates the recorded position on the disc in terms of the order of the recorded programs, and the time address signal $A_T$ indicates the total reproducing time. In addition, the track number address signal $A_N$ indicates the number of tracks when it is assumed that one track is formed from the recorded position of the reference signal fp3 as the disc undergoes one revolution. The address signals $A_C$, $A_T$, and $A_N$ each comprise 29 bits.

Figure 7:
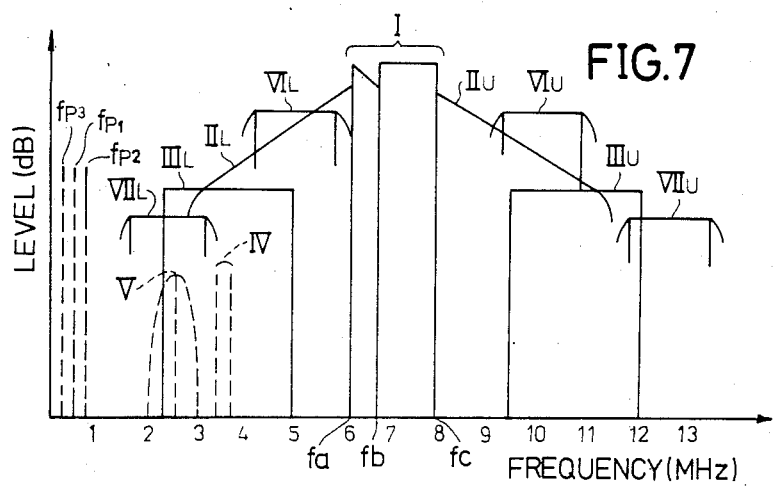
FIG. 7 shows an example of frequency spectrums of frequency modulated signals and reference signals which are recorded on analog recorded tracks on the disc according to the present invention.

FIG. 7 shows a frequency spectrum of the output signal of the analog signal processing circuit 20. In FIG. 7, I represents a carrier deviation band of 2.3 MHz of the frequency modulated luminance signal, $f_a$ represents a frequency of 6.1 MHz corresponding to the sync tip, $f_b$ represents a frequency of 6.6 MHz corresponding to the pedestal level, and $f_c$ represents a frequency of 7.9 MHz corresponding to the white peak. Further, $II_U$ and $II_L$ respectively represent upper and lower sidebands of the frequency modulated luminance signal, and $III_U$ and $III_L$ respectively represent upper and lower sidebands of the signal which is obtained by further frequency-modulating frequency modulated audio signals $f_{A1}$ and $f_{A2}$. Moreover, IV represents carriers of 3.43 MHz and 3.73 MHz of the 2-channel frequency modulated audio signals $f_{A1}$ and $f_{A2}$.

In addition, V represents a frequency band of the low-band-converted carrier chrominance signal which is obtained by frequency-converting the carrier chrominance signal within the reproduced signal from the VTR 19. First sidebands which are obtained when the low-band-converted carrier chrominance signal is frequency-modulated, are represented by $V1_U$ and $V1_L$, and second sidebands which are obtained when the low-band-converted carrier chrominance signal is frequency-modulated, are represented by $V11_U$ and $V11_L$. In FIG. 7, the frequency spectrums of the signals which are obtained from the analog signal processing circuit 20, are indicated by solid lines.

The reference signals fp1, fp2, and fp3 described later on in the specification, are located in the unoccupied frequency band below the band $V11_L$ shown in FIG. 7. The occupying frequency bands of the reference signals fp1 through fp3 and the information signals are separated, because the reference signals fp1 through fp3 and the information signals need to be picked up from the disc by the same reproducing stylus.

The first FM signal having the frequency spectrum indicated by the solid line in FIG. 6 is applied to the terminal 18a of the switching circuit 18, and a second FM signal having the frequency spectrum indicated by the solid line in FIG. 7 is applied to a terminal 18b of the switching circuit 18. The switching circuit 18 selectively produces and supplies only one of the first and second FM signals to a recording apparatus 21 under control of an output signal of the controller 17. The recording apparatus 21 is a known cutting apparatus which employs a laser beam. The recording apparatus 21 is supplied with the output signal of the switching circuit 18 as a first input signal, and a signal from an input terminal 23 as a second input signal. This second input signal from the input terminal 23 comprises a reference signal in which the first and second reference signals fp1 and fp2 are alternately switched and arranged in a burst manner for every duration of four fields which is equal to a duration of one revolution of the disc, and the third reference signal fp3 which is generated in relation to the position where the first and second reference signals fp1 and fp2 switch. The recording apparatus 21 converts the first and second input signals to first and second modulated laser beams, and simultaneously impinges the first and second modulated laser beams on a photosensitive agent which covers the surface of an original recording disc, with the first and second modulated laser beams mutually separated by approximately ½ track pitch. Then, the original recording disc is subjected to a known developing process, and to a known disc manufacturing process. As a result, the disc 22 which is produced, has an electrode function, does not have guide grooves for guiding the reproducing stylus, and has a track pattern shown in FIG. 8.

Figure 8:
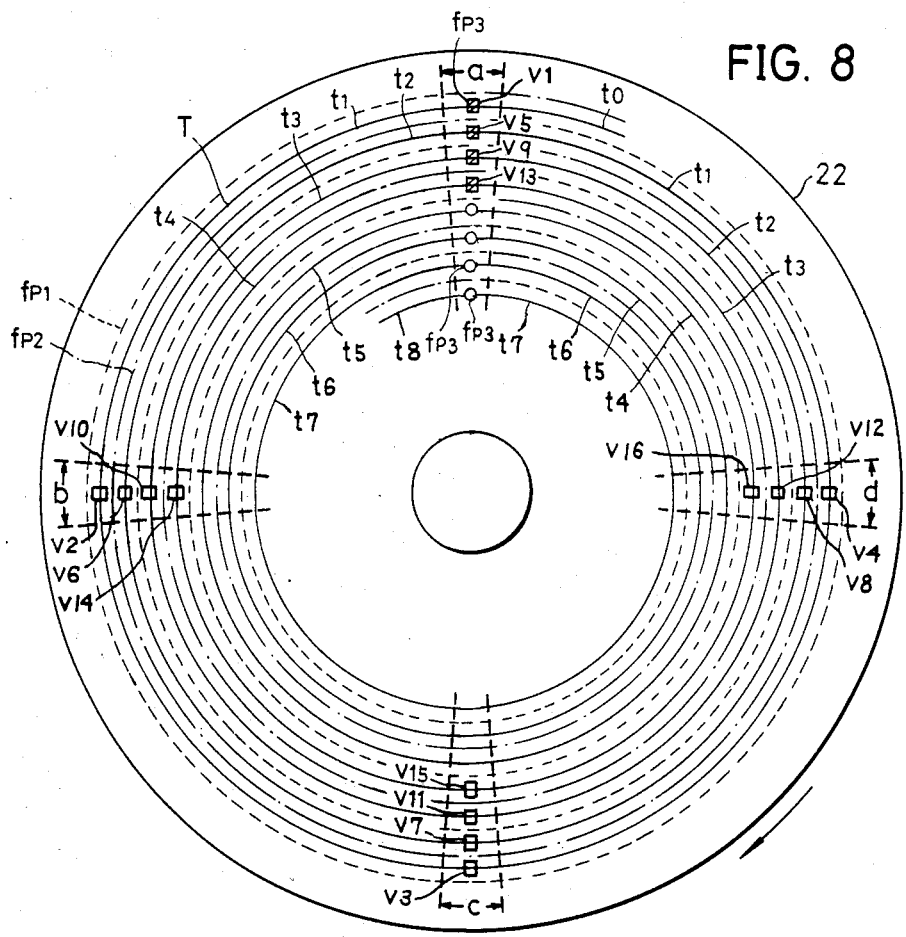
FIG. 8 shows an example of a track pattern on the disc according to the present invention.

The first FM signal or the second FM signal from the switching circuit 18, is recorded on a spiral track T on the disc 22 shown in FIG. 8, as rows of intermittent pits. In the single and continuous spiral track T which is indicated by a solid line in FIG. 8, each track turn of the disc 22 is represented by t1, t2, t3, . . . Each track is formed with pits of the information signal on a flat surface thereof, and no guide groove is formed for guiding the reproducing stylus. With respect to one track turn, pits of the first reference signal fp1 and pits of the second reference signal fp2 are respectively formed on both sides thereof along the longitudinal direction of the track for every horizontal scanning period (1H), at positions corresponding to the horizontal blanking period.

Pits of only one of the reference signals fp1 and fp2 are formed at an intermediate position between center lines of adjacent track turns. Moreover, with respect to one track turn, the sides on which the reference signals fp1 and fp2 are recorded, are alternated for each track turn. In other words, the tracks of the first reference signal fp1 are represented by broken lines, and the tracks of the second reference signal fp2 are represented by one-dot chain lines in FIG. 8. Positions where the vertical synchronizing signal is recorded in each field, are represented by $V_1$, $V_2$, $V_3$, . . . Furthermore, the third reference signal fp3 is recorded for a duration of approximately 3H, for example, at the starting positions of the tracks t1, t2, t3, . . . , that is, the positions $V_1$, $V_5$, $V_9$, . . . where the sides on which the reference signals fp1 and fp2 are recorded are interchanged.

The address signals $A_C$, $A_T$, and $A_N$ are time-sequentially recorded in recording parts a through d which correspond to the four vertical blanking periods in each of the analog recorded tracks t1 through t4 on the disc 22.

The digital recorded tracks t5, t6, t7, . . . are also formed on the spiral track T. However, the signal of one block having the signal format shown in FIG. 2, is time-sequentially multiplexed at the transmission frequency of 44.056 kHz and is recorded on the digital recorded tracks t5 through t7 as the first FM signal. Thus, the recording parts a through d which correspond to the vertical blanking periods, do not exist in the digital recorded tracks t5 through t7. On the other hand, the reference signal fp3 is recorded on the digital recorded tracks t5 through t7, radially aligned with the reference signal fp3 which is recorded on the analog recorded tracks t1 through t4. Moreover, the reference signals fp1 and fp2 are recorded on both sides of the digital recorded tracks t5 through t7 with a period of 1H. In other words, the reference signals fp1 through fp3 are constantly recorded on the disc with constant periods, regardless of whether the recorded track is an analog recorded track or a digital recorded track.

The track pattern itself is the same as the track pattern on the video disc and the digital audio disc which have been previously proposed under the same assignee. In addition, the signal format (FIGS. 2 and 3) of the digital signal recorded on the digital recorded tracks, the signal format of the digital video signal (especially related to the still picture, but may be related to a partially moving picture) shown in FIGS. 4 and 5, and the frequency spectrum of the FM signal shown in FIG. 6 which is to be recorded on the digital recorded tracks, are the same as those of the above digital audio disc. Furthermore, the frequency spectrum of the FM signal shown in FIG. 7 which is recorded on the analog recorded tracks, are also the same as that of the above video disc.

The disc according to the present invention is characterized in that the digital recorded tracks which are recorded with the first FM signal from the digital signal processing circuit 16, and the analog recorded tracks which are recorded with the second FM signal from the analog signal processing circuit 20, coexist on the same side of the disc depending on the recording information contents. In other words, audio information such as an audio signal related to a music which needs to be reproduced with a high fidelity, and video information such as a video signal related to a still picture such as a page of encyclopedia or the like, are recorded on the digital recorded tracks. On the other hand, video information such as a video signal related to a moving picture, is recorded on the analog recorded tracks.

The rotational speed of the digital audio disc previously proposed under the same assignee, is 900 rpm. In addition, the number of blocks in one revolution of this digital audio disc is 2940, and the transmission frequency of one block is 44.1 kHz. On the other hand, in the present embodiment of the disc 22 according to the present invention, the number of blocks in the digital recorded track in one revolution of the disc 22 is also 2940 and is the same as the number of blocks in the digital audio disc, however, the rotational speed of the disc 22 is 899.1 rpm which is the same as the rotational speed of the video disc. Further, in the disc 22, the transmission frequency of one block is selected to 44.056 kHz which is extremely close to 44.1 kHz. That is, the rotational speed of the disc 22 for reproducing the composite video signal which has 525 scanning lines, a field frequency of 59.94 Hz, and is recorded on the analog recorded tracks, is 899.1 rpm. In order to reproduce the digital signal from the digital recorded tracks on the disc 22 at the same rotational speed of 899.1 rpm, the transmission frequency of the digital signal recorded on the digital recorded tracks is selected to as to $44.1 \times 10^3 \times 899.1/900 = 44.056 \times 10^3$ Hz.

Accordingly, it is possible to play the disc according to the present invention on the existing disc reproducing apparatus, compatibly with the existing digital audio disc and the existing video disc which were previously proposed under the same assignee, by only making a simple modification of the existing disc reproducing apparatus.

In the disc according to the present invention, four first tracks and four second tracks, that is, a total of eight tracks, are formed between the digital recorded track and the analog recorded track. The first track is recorded with the first FM signal having a signal which is silent and contains no data as the modulating signal. The second track is recorded with the second FM signal having a composite video signal (so-called black burst signal) which contains all black picture information in the video durations of the composite video signal as the modulating signal. In this case, the first tracks are formed adjacent to the digital recorded tracks, and the second tracks are formed adjacent to the analog recorded tracks. As a result, when the reproducing stylus moves from the first track to the second track, it can be detected from the second FM signal which is reproduced from the second track that the analog recorded tracks will be reproduced subsequently. On the other hand, when the reproducing stylus moves from the second track to the first track, it can be detected from the first FM signal which is reproduced from the first track that the digital recorded track will be reproduced subsequently.

Four first tracks and four second tracks exist between the digital recorded track and the analog recorded track. Thus, even when a dropout occurs in the reproduced signal, it is possible to positively detect the position where the recorded track changes between the digital recorded track and the analog recorded track. In addition, even when there is a time delay in a circuit which carries out a switching and operates one of a digital signal demodulating circuit and an analog signal demodulating circuit so as to demodulate the signals which are reproduced from the disc, it is possible to demodulate the signals reproduced from the analog recorded tracks or the digital recorded tracks only after one of the demodulating circuits has been operated, since the switching can be completed while the reproducing stylus reproduces the first and second tracks.

Next, description will be given with respect to a second embodiment of a recording system for recording the disc according to the present invention, by referring to FIG. 9. In FIG. 9, those parts which are the same as those corresponding parts in FIG. 1 are designated by the same reference numerals. PCM recording and reproducing apparatuses 25 and 26 each obtain data, by subjecting an analog audio signal or still picture signal which is reproduced from a magnetic tape by the respective VTRs 11 and 12, to a pulse code modulation. Then, the PCM recording and reproducing apparatuses 25 and 26 each obtain a PCM signal by adding the error detecting code and the error correcting codes to the pulse code modulated signal. Further, the PCM recording and reproducing apparatuses 25 and 26 each add to the PCM signal the horizontal and vertical synchronizing signals which are in conformance with the SECAM system. For example, the PCM recording and reproducing apparatuses 25 and 26 respectively have the same construction as the PCM recording and reproducing apparatuses 13 and 14 shown in FIG. 1. An oscillator 27 produces a signal having a frequency of 15.625 kHz which is equal to the horizontal scanning frequency of the PAL system or the SECAM system. The PCM recording and reproducing apparatuses 25 and 26 each operate in synchronism with a signal from a frequency divider 28. This signal from the frequency divider 28 has a frequency of 15.75 kHz, because the frequency divider 28 frequency-divides the signal from the oscillator 27 by 126/125. Therefore, the sampling frequency $f_s$ in this case is equal to 44.100 kHz.

A total of four channels of digital signals having the sampling frequency of 44.100 kHz and a quantization number of 16 bits, are respectively supplied to a digital signal processing circuit 29 from the PCM recording and reproducing apparatuses 25 and 26. The digital signal processing circuit 29 generates a signal of one block (frame) having a signal format shown in FIG. 2, under control of the output signal of the controller 17. The digital signal processing circuit 29 time-sequentially multiplexes the generated signal in terms of blocks, at a transmission frequency of 44.100 kHz. Further, the digital signal processing circuit 29 obtains a frequency modulated signal by frequency-modulating a carrier having a frequency in the range of 7 MHz, for example, by the time-sequentially multiplexed signal, and applies this frequency modulated signal having the frequency spectrum shown in FIG. 6 to the terminal 18a of the switching circuit 18.

In other words, digital signals having the same signal format as the digital signals recorded in the first embodiment described previously, are recorded on the digital recorded tracks on a disc 31 according to this second embodiment. The difference between the first and second embodiments, is that the transmission frequency of the blocks is equal to 44.100 kHz in this second embodiment. Further, as will be described later on in the specification, a composite color video signal which is to be reproduced as a PAL or SECAM system color video signal having 625 scanning lines and a field frequency of 50 Hz, is recorded on the analog recorded tracks at a rate of four fields in one j revolution of the disc 31, unlike in the first embodiment. Accordingly, the disc 31 on which the analog recorded tracks and the digital recorded tracks coexist, is rotated at a rotational speed of 750 $(=(50/4)\times 60)$ rpm when reproducing the recorded signals from the disc 31. This means that 3528 $(=44.100\times 10^3\times(4/50))$ blocks are recorded on and reproduced from the disc 31 in one revolution of the disc 31. Therefore, the 196-bit address signal having the signal format shown in FIG. 3, is recorded on and reproduced from the disc 31, 18 times in one revolution of the disc 31.

On the other hand, a VTR 30 plays a magnetic tape (not shown) which has been pre-recorded with a PAL or SECAM system color video signal related to a moving picture and an audio signal, in synchronism with the signal from the oscillator 27 having the frequency of 15.625 kHz which is equal to the horizontal scanning frequency. The VTR 30 supplies to the analog signal processing circuit 20 the signals which are reproduced from the magnetic tape. The analog signal processing circuit 20 generates the second FM signal which has the same frequency spectrum (indicated by the solid line in FIG. 7) as the second FM signal generated in the first embodiment.

The track pattern itself on the disc 31, is the same as the track pattern shown in FIG. 8, and is therefore the same as the track pattern in the first embodiment. However, the transmission frequency of the blocks of the digital signals recorded on the digital recorded tracks on the disc 31 and the number of blocks in one revolution of the disc 31, the number of scanning lines and the horizontal scanning frequency of the composite video signal recorded on the analog recorded tracks on the disc 31, and the rotational speed of the disc 31, are respectively different from those of the first embodiment.

Figure 10:
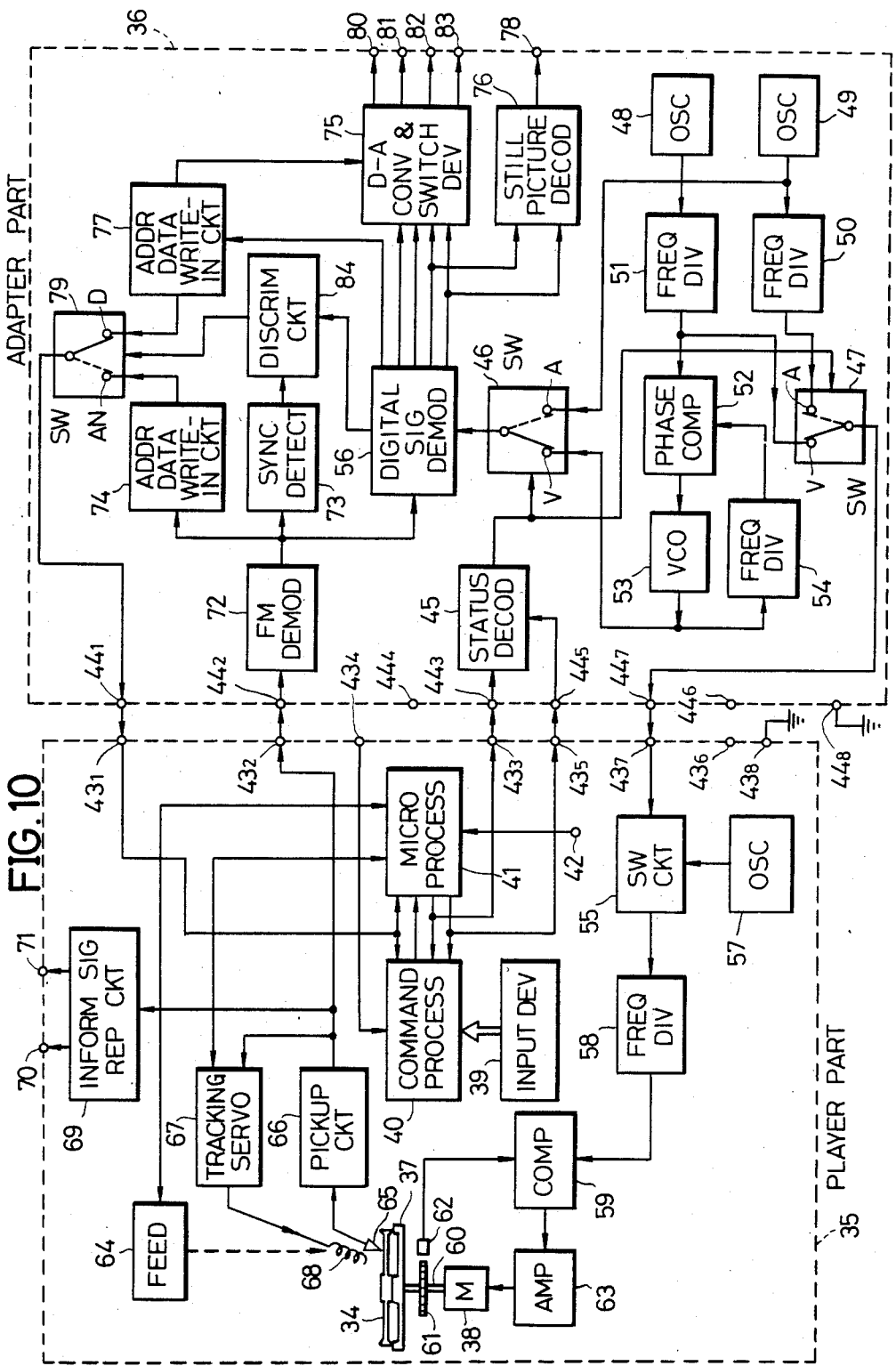
FIG. 10 is a systematic block diagram showing an example of a reproducing apparatus which plays the disc according to the present invention.

Next, description will be given with respect to an apparatus which plays the disc according to the present invention, by referring to FIG. 10. In FIG. 10, a disc reproducing apparatus comprises a player part 35 and an adapter part 36. A turntable 37 within the player part 35, is rotated by a motor 38. When a load switch of an input device 39 is manipulated, an output signal of this load switch is supplied to a command processor 40, and is then supplied to a microprocessor 41. Signals from the input device 39, command signals from an external device such as a personal microcomputer having a discriminating function, and the like, are supplied to the command processor 40. The command processor 40 carries out operations such as driving a display device (not shown) according to a display mode, and transferring the signals from the input device 39 to the microprocessor 41.

As will be described later on in the specification, the microprocessor 41 generates and supplies signals such as a clock signal and a status signal to the command processor 40. On the other hand, the microprocessor 41 controls the operations of various mechanisms and circuits within the player part 35, and puts the player part 35 in a state where a disc 34 can be inserted into the player part 35 from the outside in response to the output signal of the load switch. As described in the U.S. Pat. No. 4,352,174 in which the assignee is the same as the assignee of the present application, the disc 34 is accommodated within a disc accommodating case (not shown) when the disc 34 is outside the player part 35. When the disc accommodating case accommodating therein the disc 34 is inserted into the player part 35 in the above state and is then extracted from the player part 35, predetermined mechanisms operate to keep the disc 34 and a lid plate of the disc accommodating case inside the player part 35. Description of the predetermined mechanisms will be omitted in the present specification. As a result, only an empty jacket of the disc accommodating case is extracted from the player part 35. The disc 34 is placed onto the turntable 37 inside the player part 35.

On the other hand, at the same time, a plurality of microswitches (not shown) located at the innermost part of the player part 35 are turned ON and OFF depending on the combination of the existence and non-existence of cutouts located on the front end of the lid plate. As disclosed in a U.S. Pat. No. 4,419,710 in which the assignee is the same as the assignee of the present application, it is possible to detect various recorded contents on the disc, the side of the disc to be reproduced, and the like, from the ON and OFF states of the microswitches. The output signals of the microswitches, such as a disc discriminating signal which indicates whether the disc 34 is a digital audio disc or a video disc (it will be assumed that the disc according to the present invention is discriminated as being a video disc), are supplied to the microprocessor 41 through an input terminal 42. Hence, the microprocessor 41 serially supplies a 25-bit status signal, for example, to a pin terminal $43_3$ of a DIN-type 8-pin connector.

Figure 11:
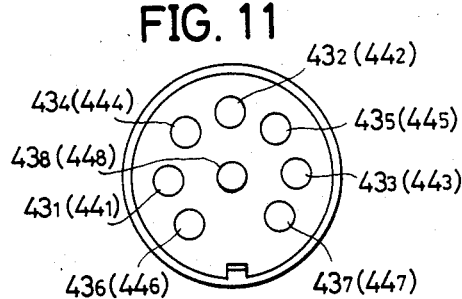
FIG. 11 shows an example of an 8-pin connector used in the reproducing apparatus.

As shown in FIG. 11, the 8-pin connector comprises pin terminals $43_1$ through $43_8$. The address data from the adapter part 36 is applied to the pin terminal $43_1$, and a reproduced signal (RF signal) is produced through the pin terminal $43_2$ as will be described hereinafter. A command signal of an external device such as a personal microcomputer having a discriminating function, is applied to the pin terminal $43_4$ according to the needs. The clock signal from the microprocessor 41 is produced through the pin terminal $43_5$. An external synchronizing signal from the adapter part 36, is applied to the pin terminal $43_7$ Further, the pin terminal $43_8$ is grounded, and the pin terminal $43_6$ is not used. When coupling the player part 35 to a personal microcomputer or the like, unlike in the case where the player part 35 is coupled to the adapter part 36, the address data is produced from the pin terminal $43_1$, the reproduced audio signal is produced through the pin terminal $43_6$, and the pin terminal $43_7$ is not used.

The status signal from the microprocessor 41 shown in FIG. 10, is produced in synchronism with the clock signal. This status signal is supplied to a status decoding circuit 45 wherein the value of the second bit of the status signal is detected, through a pin terminal $44_3$ of a DIN-type 8-pin connector comprising pin terminals $44_1$ through $44_8$ as shown in FIG. 11. The second bit of the status signal indicates whether the disc 34 is a digital audio disc or a video disc (the disc according to the present invention will be detected as a video disc). The clock signal is supplied to the status decoding circuit 45 and the like, through the pin terminals $43_5$ and $44_5$. An output signal of the status decoding circuit 45 is applied to switching circuits 46 and 47 as a switching signal. When the digital audio disc is being played, the switching circuits 46 and 47 are connected to respective terminals A in response to this switching signal. On the other hand, when the video disc or the disc according to the present invention is being played, the switching circuits 46 and 47 are connected to respective terminals V in response to the switching signal from the status decoding circuit 45. Accordingly, in a case where the disc 34 being played is the disc 22 according to the present invention, the switching circuits 46 and 47 are connected to the respective terminals V.

Oscillators 48 and 49 are provided within the adapter part 36. The oscillator 48 produces a signal having a frequency which is four times the chrominance subcarrier frequency (3.579545 MHz in this case) of the color video signal which is to be originally reproduced in a monitoring reproducing apparatus (not shown) which is supplied with the reproduced composite video signal from the disc reproducing apparatus. The oscillator 49 produces a signal having a frequency of 6.174 MHz which is 140 times the transmission frequency of the digital signals (blocks) in the digital audio disc. The output signal of the oscillator 49 having the frequency of 6.174 MHz is supplied to the terminal A of the switching circuit 46. Further, the output signal of the oscillator 49 is frequency-divided by 1/392 into a signal having a frequency of 15.75 kHz in a frequency divider 50. On the other hand, the output signal of the oscillator 48 is frequency-divided by 1/910 into a signal having the horizontal scanning frequency of 15.734 kHz in a frequency divider 51. The output signal of the frequency divider 51 is supplied to a phase comparator 52 and to the terminal V of the switching circuit 47.

The phase comparator 52 constitutes a known phase locked loop (PLL) together with a voltage controlled oscillator (VCO) 53 and a 1/392-frequency divider 54. A signal having a frequency which is 392 times the horizontal scanning frequency of 15.734 kHz, is supplied to the terminal V of the switching circuit 46 from the VCO 53. That is, the output signal frequency of the VCO 53 is equal to 6.1678 MHz which is 140 times the transmission frequency of 44.056 kHz of the digital signals on the digital recorded tracks. The output signal of the VCO 53 is also supplied to the phase comparator 52 through the 1/392-frequency divider 54. As described before, the switching circuit 47 is connected to the terminal V when the disc 34 being played is the disc 22 according to the present invention. Thus, in this state, the switching circuit 47 selectively produces the signal which is applied to the terminal V thereof. In other words, the switching circuit 47 selectively produces the output signal of the frequency divider 51 having the frequency of 15.734 kHz, and this output signal of the switching circuit 47 is supplied to a switching circuit 55 within the player part 35 as an external motor rotation synchronizing signal, through the pin terminals 44 and $43_7$ At the same time, the switching circuit 46 selectively produces the output signal of the VCO 53 having the frequency of 6.1678 MHz, and this output signal of the switching circuit 46 is supplied to a digital signal demodulating circuit 56 as a master clock signal.

The switching circuit 55 is designed to selectively produce the signal having the horizontal scanning frequency $f_H$ when this signal is applied to the pin terminal $43_7$, and to selectively produce the output signal of an oscillator 57 having the horizontal scanning frequency $f_H$ when the above signal is not applied to the pin terminal $43_7$.

The motor rotation synchronizing signal from the switching circuit 55 having the frequency of 15.734 kHz, is frequency-divided by 1/21 in a frequency divider 58, and an output signal of this frequency divider 58 is supplied to a comparator 59. A rotary shaft 60 of the motor 38 is fixed with a gear wheel 61. The gear wheel 61 comprises 50 teeth, for example, on the outer peripheral surface thereof at equal angular intervals. A magnetic detector 62 is located at a position where the magnetic detector 62 opposes the teeth of the gear wheel 61 over a small distance. As the motor 38 rotates, the turntable 37 rotates unitarily with the motor 38. Hence, the disc 34 which is placed on the turntable 37 and the gear wheel 61 respectively rotate. Every time the teeth of the gear wheel 61 passes by the magnetic detector 62, one pulse is produced from the magnetic detector 62 and supplied to the comparator 59.

When the disc 34 being played is the disc 22 according to the present invention, four fields of the NTSC system color video signal are recorded on the analog recorded track in one revolution of the disc 34. Hence, 1050 scanning lines are recorded in one revolution of the disc 34 in this case, and 21 scanning lines are reproduced from the disc 34 every time one pulse is produced from the magnetic detector 62. For this reason, the frequency divider 58 frequency-divides the horizontal scanning frequency of 15.734 kHz by 1/21, and the frequency divided signal from the frequency divider 58 is supplied to the comparator 59 together with the output pulse of the magnetic detector 62. The comparator 59 produces an error voltage which is in accordance with the phase error, and supplies this error voltage to the motor 38 through a motor driving amplifier 63. As a result, the motor 38 is controlled so that the horizontal synchronizing signal is reproduced from the disc 34 at the same frequency as the motor rotation synchronizing signal from the frequency divider 58 having the frequency of 15.734 kHz, and the disc 34 and the motor 38 are rotated at a rotational speed of 899.1 rpm.

When the operator pushes a start switch of the input device 39 after the motor 38, the turntable 37, and the disc 34 1 have started to rotate, a signal which causes a feed mechanism 64 to move in the inner peripheral direction of the disc 34 is produced through the command processor 40 and the microprocessor 41. A reproducing stylus 65 which is fed by the feed mechanism 64, thereafter makes sliding contact with disc 34. The disc 34 has an electrode function, and an electrode is formed on the reproducing stylus 65. Thus, an electrostatic capacitance is formed between the disc 34 and the electrode of the reproducing stylus 65, and this electrostatic capacitance varies according to variations in the geometrical configuration of the recorded tracks. The variations in the electrostatic capacitance is picked up and converted into an electrical signal according to a known method in a pickup circuit 66.

The reproduced signal (RF signal) obtained from the pickup circuit 66, is supplied to a known tracking servo circuit 67. The tracking servo circuit 67 discriminate and separate the reference signals fp1 and fp2, detect the envelopes of the reference signals fp1 and fp2, and differentially amplifies the detected envelopes so as to produce a tracking error signal. The tracking error signal is applied to a tracking coil 68 which controls the reproducing stylus 65 so that the reproducing stylus 65 constantly scans over the recorded track without tracking error. As a result, the stylus tip of the reproducing stylus 65 is minutely displaced in the width direction of the track, instant by instant, depending on the tracking error.

The reproduced signal from the pickup circuit 66 is supplied to an information signal reproducing circuit 69. The reproducing circuit 69 frequency-demodulates the second FM signal which is reproduced from the analog recorded tracks, so as to obtain the composite video signal which is in conformance with the NTSC system and the audio signal. The reproduced composite video signal is produced through an output terminal 70, and the reproduced audio signal is produced through an output terminal 71.

Further, the reproduced signal from the pickup circuit 66 is supplied to a demodulator 72 within the adapter part 36, through the pin terminals $43_2$ and $44_2$. The demodulator 72 frequency-demodulates the reproduced signal, and supplies a demodulated signal to a vertical synchronizing signal detecting circuit 73, an address data write-in circuit 74, and the digital signal demodulating circuit 56. As described before, the master clock signal obtained from the switching circuit 46 and having the frequency of 6.1678 MHz, is supplied to the digital signal demodulating circuit 56, and the digital signal demodulating circuit 56 detects the existence of an error by use of the error detecting code CRC within the demodulated digital signal which is reproduced from the digital recorded tracks and has the signal format shown in FIG. 2. When it is detected that the error does exist within the demodulated digital signal, the digital signal demodulating circuit 56 corrects the error by use of the error correcting codes P and Q. Further, the digital signal demodulating circuit 56 supplies the digital audio signals which are transmitted in the positions Ch-1 through Ch-4 shown in FIG. 2, to a digital-to-analog (D-A) converter and switching device 75. On the other hand, in the case where the digital video signal is transmitted in at least one of the positions Ch-3 and Ch-4 shown in FIG. 2, the digital signal demodulating circuit 56 supplies the digital video signal to a still picture decoder 76. The D-A converter and switching device 75 subjects the digital audio signals to a digital-to-analog conversion, and is switched and controlled in response to an output of an address data write-in circuit 77.

The still picture decoder 76 produces an analog video signal of the desired standard television system, related to the original still picture, from the digital video signal which is supplied thereto. This analog video signal from the still picture decoder 76 is produced through an output terminal 78. The address data write-in circuit 77 writes therein the address data of the address signal having the signal format shown in FIG. 3, by storing the 1-bit signal which is located at the position Adr shown in FIG. 2 and is obtained from each block. The address data written in the address data write-in circuit 77, is supplied to a terminal D of a switching circuit 79, and to the D-A converter and switching device 75. The D-A converter and switching device 75 produces a switching signal based on the address data from the address data write-in circuit 77, produces only the audio signals through two or more output terminals among output terminals 80 through 83. In other words, when a 4-channel audio signal is reproduced from the disc 34, the audio signals of the four channels are produced through all of the output terminals 80 through 83. When a 3-channel audio signal is reproduced from the disc 34, the audio signals of the three channels are produced through the output terminals 80 through 82. Further, when two kinds of 2-channel audio signals are reproduced from the disc 34, the audio signals of the two channels in one selected kind of 2-channel audio signal are produced through the output terminals 80 and 81 (or 82 and 83).

The address data write-in circuit 74 discriminate and separates the address signal within the signal which is reproduced from the analog recorded tracks, and writes therein the address data of the separated address signal. The written address data is applied to a terminal AN of the switching circuit 79. The vertical synchronizing signal detection signal from the vertical synchronizing signal detecting circuit 73, and the detection signal from the digital signal demodulating circuit 56 indicating the error detection result by the use of the error detecting code CRC, are respectively supplied to a discriminating circuit 84. In a duration in which the vertical synchronizing signal detection signal is not supplied to the discriminating circuit 84 and the detection signal supplied to the discriminating circuit 84 from the digital signal demodulating circuit 56 indicates that there is no error, the discriminating circuit 84 discriminates that the digital recorded track is being reproduced and connects the switching circuit 79 to the terminal D. On the other hand, in a duration in which the vertical synchronizing signal detection signal is supplied to the discriminating circuit 84 and the detection signal supplied to the discriminating circuit 84 from the digital signal demodulating circuit 56 indicates that there is an error, the discriminating circuit 84 discriminates that the analog recorded track is being reproduced and connects the switching circuit 79 to the terminal AN. Accordingly, the output address data of the address data write-in circuit 74 is obtained from the switching circuit 79 while the analog recorded track is being reproduced. On the other hand, the output address data of the address data write-in circuit 77 is obtained from the switching circuit 79 while the digital recorded track is being reproduced. The reproduced address data obtained from the switching circuit 79, is supplied to the command processor 40 and the microprocessor 41 within the player part 35, through the pin terminals $44_1$ and $43_1$. The command processor 40 constantly displays the position of the reproducing stylus 65 with the address data which is designated. The microprocessor 41 produces various kinds of signals based on the signals from the input device 39 and the input address data, and supplies the various kinds of signals to the feed mechanism 64. For example, during a random access, the reproducing stylus 65 is moved at a high speed to the track position having the address which is designated by the input device 39.

Hence, even in the case where the disc 34 is the disc 22 according to the present invention which the digital recorded tracks and the analog recorded tracks coexist, it is possible to satisfactorily reproduce the signals from the recorded tracks on the disc 34.

In a case where the disc 34 is the conventional digital audio disc, the switching circuits 46 and 47 are connected to the respective terminals A in response to the output signal of the status decoding circuit 45. In this case, the output signal of the oscillator 49 having the frequency of 6.174 MHz, is produced from the switching circuit 46 and is supplied to the digital signal demodulating circuit 56 as the master clock signal. In addition, the output signal of the frequency divider 50 having the frequency of 15.75 kHz, is produced from the switching circuit 47 and is supplied to the frequency divider 58 as the motor rotation synchronizing signal, through the pin terminals $44_7$ and $43_7$. The switching circuit 79 is constantly connected to the terminal D.

In a case where the disc 34 is the conventional video disc, the switching circuits 46 and 47 are connected to the respective terminals V and the switching circuit 79 is constantly connected to the terminal AN, as in the case where the disc 34 is the disc 22 according to the present invention.

When reproducing the analog recorded tracks, the reproducing stylus 65 is minutely displaced in the track scanning direction, instant by instant, so as to compensate for the jitter during the reproduction as is well known. On the other hand, the jitter in the digital signals which are reproduced from the digital recorded tracks, can be compensated in the digital signal demodulating circuit 56. Hence, it is unnecessary to minutely displace the reproducing stylus 65 in the track scanning direction while reproducing the digital recorded tracks. Therefore, the operation of minutely displacing the reproducing stylus 65 in the track scanning direction so as to compensate for the jitter in the reproduced signals, is carried out depending on the kind of recorded track which is being reproduced. The output signal of the vertical synchronizing signal detecting circuit 73 may be used as a signal for switching and deactiating a displacing mechanism (not shown, and including a jitter compensation coil and the like) which displaces the reproducing stylus 65 in the track scanning direction. However, the jitter compensating operation may be carried out regardless of whether the analog recorded track or the digital recorded track is being reproduced. In such a case, it is possible to displace the reproducing stylus 65 in the track scanning direction so that the reference signals fp1 and fp2 are reproduced with a period of 1H, by noting that the reference signals fp1 and fp2 are recorded on the disc with the period of 1H.

Next, description will be given with respect to an essential part of another example of a reproducing apparatus for playing the disc 31, by referring to FIG. 12. In FIG. 12, those parts which are the same as those corresponding parts in FIG. 10 are designated by the same reference numerals, and their description will be omitted. Parts in FIG. 12 which are omitted and not shown, are the same as those corresponding parts in FIG. 10. An oscillator 101 and the oscillator 49 are provided within the adapter part. The oscillator 101 produces a signal having a frequency which is four times the chrominance subcarrier frequency (4.433618 MHz in this case) of the color video signal which is to be originally reproduced in a monitoring reproducing apparatus (not shown) which is supplied with the reproduced composite video signal from the disc reproducing apparatus. The output signal of the oscillator 101 is supplied to a frequency divider 102 wherein the signal is frequency-divided into a signal having the horizontal scanning frequency of 15.625 kHz. The output signal of the frequency divider 102 is applied to the terminal V of the switching circuit 47. The output signal of the frequency divider 102 is also frequency-divided by 1/125 in a frequency divider 103, and an output signal of this frequency divider 103 is supplied to a phase comparator 104.

The phase comparator 104 constitutes a known PLL together with a VCO 105 and a 1/49392-frequency divider 106. A signal having a frequency which is 49392/125 times the horizontal scanning frequency of 15.625 kHz, is supplied to the terminal V of the switching circuit 46 from the VCO 105. That is, the output signal frequency of the VCO 105 is equal to 6.1740 MHz which is 140 times the transmission frequency of 44.100 kHz of the digital signals on the digital recorded tracks of the disc 31. The output signal of the VCO 105 is also supplied to the phase comparator 104 through the 1/49392 frequency divider 106. The switching circuit 47 is connected to the terminal V when the disc 34 being played is the disc 31 according to the present invention. Thus, in this state, the switching circuit 47 selectively produces the signal which is applied to the terminal V thereof. In other words, the switching circuit 47 selectively produces the output signal of the frequency divider 102 having the frequency of 15.625 kHz, and this output signal of the switching circuit 47 is supplied to a switching circuit 55 within the player part as an external motor rotation synchronizing signal, through the pin terminals 44₇ and 43₇. At the same time, the switching circuit 46 selectively produces the output signal of the VCO 105 having the frequency of 6.1740 MHz, and this output signal of the switching circuit 46 is produced through an output terminal 107.

The signal from the switching circuit 55 having the frequency of 15.625 kHz, is frequency-divided by 1/25 in a frequency divider 108, and an output signal of this frequency divider 108 is supplied to the comparator 59 shown in FIG. 10 through an output terminal 109.

When the disc 34 being played is the disc 31 according to the present invention, four fields of the PAL or SECAM system color video signal are recorded on the analog recorded track in one revolution of the disc 34. Hence, 1250 scanning lines are recorded in one revolution of the disc 34 in this case, and 25 scanning lines are reproduced from the disc 34 every time one pulse is produced from the magnetic detector 62 shown in FIG. 10. For this reason, the frequency divider 108 frequency-divides the horizontal scanning frequency of 15.625 kHz by 1/25, and the frequency divided signal from the frequency divider 108 is supplied to the comparator 59 together with the output pulse of the magnetic detector 62. The comparator 59 produces an error voltage which is in accordance with the phase error, and supplies this error voltage to the motor 38 through a motor driving amplifier 63. As a result, the motor 38 is controlled so that the horizontal synchronizing signal is reproduced from the disc 34 at the same frequency as the motor rotation synchronizing signal from the frequency divider 108 having the frequency of 15.625 kHz, and the disc 34 and the motor 38 are rotated at a rotational speed of 750 rpm.

An oscillator 110 produces a signal having the horizontal scanning frequency of 15.625 kHz, and this signal from the oscillator 110 is supplied to the frequency divider 108 through the switching circuit 55 when no signal is obtained through the pin terminal 43₇.

The disc according to the present invention was described heretofore with respect to a case where the composite video signal which is obtained by converting the signal format of the color video signal to a predetermined signal format, is recorded on the analog recorded tracks at a rate of four fields in one revolution of the disc. However, the composite video signal can be recorded on the analog recorded tracks on the disc at a rate of N fields in one revolution of the disc, where N is a natural number greater than or equal to two. Further, a black and white composite video signal may be recorded on the analog recorded tracks on the disc according to the present invention. The duration of one revolution of the disc according to the present invention on which the analog recorded tracks and the digital recorded tracks coexist, where the analog recorded tracks are recorded with N fields of composite video signal in one revolution of the disc, is naturally equal to N times the vertical scanning period. The number of blocks recorded on the digital recorded track in one revolution of the disc, is selected to a product of the transmission frequency and the duration of one revolution of the disc, or to a value which is extremely close to this product.

It was described heretofore that the disc according to the present invention can be played compatibly with the existing digital audio disc and the existing video disc. However, the present invention may also be applied to an optical type disc from which the recorded information is read by the use of a light beam. The present invention may of course be applied to a disc of the type which is not recorded with the reference signals fp1 through fp3. Moreover, as proposed in a U.S. patent application Ser. No. 574,521 in which the assignee is the same as the assignee of the present application, the information signal which is recorded on the disc, also includes a program for carrying out an interactive control between the disc reproducing apparatus and an external device such as a personal microcomputer having a discriminating function.

The information signal recorded on the digital recorded tracks may be an information signal (a video signal, for example) which is other than the audio signal, in all of the four channels. For example, a video signal may be recorded in all of the four channels, to record on the disc the contents of an encyclopedia, a telephone directory, and the like.

Further, the present invention is not limited to these embodiments, but various variations and modifications may be made without departing from the scope of the present invention.

What is claimed is:

1. A rotary recording medium having information signals recorded on a spiral track or concentric tracks formed thereon, said spiral track or concentric tracks comprising digital track turns which are recorded with a first modulated signal and analog track turns which are recorded with a second modulated signal, said first modulated signal being a digital signal which comprises modulated time-sequentially multiplexed blocks of digital data, said blocks of digital data being transmitted at a transmission frequence of 44.1 kHz or the transmission frequency extremely close to 44.1 kHz, each of said blocks of digital data comprising a synchronizing signal, error correcting codes, an error detecting code, and digitally modulated information signals of a plurality of channels, said second modulated signal being an analog modulated analog information signal at least including a composite video signal, a number of blocks recorded in one track turn of said digital track turns being approximately equal to a product of said transmission frequency and a duration of one revolution of said rotary recording medium.

2. A rotary recording medium as claimed in claim 1 in which first and second track parts are formed between adjacent digital and analog track turns, said first track part being recorded with a first modulated signal which is a digital modulated signal containing a predetermined data, said second track part being recorded with a second modulated signal which is an analog modulated composite video signal containing an entirely black picture information in video signal durations thereof.

3. A rotary recording medium as claimed in claim 2 in which said track part is formed adjacent to said digital track turn, and said second track part is formed adjacent to said analog track turn.

4. A rotary recording medium having information signals recorded on a spiral track formed thereon as variations in a surface geometry of said rotary recording medium, first and second reference signals having first and second frequencies respectively and being recorded on intermediate parts of said rotary recording medium located between center lines of adjacent track turns so that said first and second reference signals are respectively recorded on the intermediate parts in alternating sequence in a radial direction of said rotary recording medium, said first frequency being different from said second frequency, a third reference signal being recorded at positions where sides on which said first and second reference signals are recorded with respect to one track turn are interchanged, said information signals being reproduced from said rotary recording medium by a reproducing element of a reproducing apparatus which has means for controlling tracking of said reproducing element by an error signal which is obtained by comparing levels of envelopes of said first and second reference signals which are reproduced from said rotary recording medium by said reproducing element, said spiral track comprising digital track turns which are recorded with a first modulated signal and analog track turns which are recorded with a second modulated signal, said first modulated signal being a digital signal which comprises modulated time-sequentially multiplexed blocks of digital data, said blocks of digital data being transmitted at a transmission frequency of 44.1 kHz or the transmission frequency extremely close to 44.1 kHz, each of said blocks of digital data comprising a synchronizing signal, error correcting codes, an error detecting code, and digitally modulated information signals of a plurality of channels, said second modulated signal being an analog modulated analog information signal at least including a composite video signal, a number of blocks recorded in one track turn of said digital track turns being approximately equal to a product of said transmission frequency and a duration of one revolution of said rotary recording medium, said first and second reference signals being recorded at the intermediate part between the center lines of the adjacent track turns in both track turns so that said first and second reference signals are respectively recorded on the intermediate parts in alternating sequence in the radial direction of said rotary recording medium, said third reference signal being recorded on both said digital track turns and said analog track turns for a constant duration at every track turn.

5. A rotary recording medium as claimed in claim 4 in which first and second track parts are formed between adjacent digital and analog track turns, said first track part being recorded with a first modulated signal which is a digital modulated signal containing a predetermined data, said second track part being recorded with a second modulated signal which is an analog modulated composite video signal containing an entirely black picture information in video signal durations thereof.

6. A rotary recording medium as claimed in claim 5 in which said first track part is formed adjacent to said digital track turn, and said second track part is formed adjacent to said analog track turn.

7. A rotary recording medium as claimed in claim 4 in which said composite video signal recorded on said analog track turns has 525 scanning lines and a field frequency of 59.94 Hz or 60 Hz and is recorded at a rate of four fields in one track turn, and said digital signal recorded on said digital track turns has a transmission frequency of 44.056 kHz or the transmission frequency extremely close to 44.056 kHz and is recorded at a rate of 2940 block in one track turn.

8. A rotary recording medium as claimed in claim 4 in which said composite video signal recorded on said analog track turns has 525 scanning lines and a field frequency of 50 Hz and is recorded at a rate of four fields in one track turn, and said digital signal recorded on said digital track turns has a transmission frequency of 44.1 kHz and is recorded at a rate of 3528 blocks in one track turn.

* * * * *